(12) United States Patent
Bublil et al.

(10) Patent No.: US 6,704,361 B2
(45) Date of Patent: Mar. 9, 2004

(54) VARIABLE LENGTH DECODER FOR DECODING DIGITALLY ENCODED VIDEO SIGNALS

(75) Inventors: Moshe Bublil, Sunnyvale, CA (US); Subroto Bose, Santa Clara, CA (US); Shirish C. Gadre, San Jose, CA (US); John Hong, San Jose, CA (US); Taner Ozcelik, Palo Alto, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 189 days.

(21) Appl. No.: 09/280,437

(22) Filed: Mar. 29, 1999

(65) Prior Publication Data

US 2003/0043917 A1 Mar. 6, 2003

Related U.S. Application Data

(60) Provisional application No. 60/085,797, filed on May 18, 1998.

(51) Int. Cl.$^7$ ................................................. H04N 7/12
(52) U.S. Cl. .............................................. 375/240.23
(58) Field of Search ..................... 375/240.01, 240.23, 375/240.25

(56) References Cited

U.S. PATENT DOCUMENTS

| | | |
|---|---|---|
| 5,502,493 A | 3/1996 | Meyer |
| 5,557,538 A | 9/1996 | Retter et al. |
| 5,579,052 A | 11/1996 | Artieri |
| 5,598,483 A | 1/1997 | Purcell et al. |
| 5,604,499 A | 2/1997 | Miyagoshi et al. |
| 5,608,459 A | 3/1997 | Hashimoto et al. |
| 5,614,952 A | 3/1997 | Boyce et al. |
| 5,623,308 A | 4/1997 | Civanlar et al. |
| 5,623,311 A | 4/1997 | Phillips et al. |
| 5,623,423 A | 4/1997 | Lipovski |
| 5,625,356 A | 4/1997 | Lee et al. |
| 5,736,946 A | 4/1998 | Sohn |

OTHER PUBLICATIONS

Patent Office, *PCT International Search Report Form PCT/ISA/210*.
Seung Bae Choi et al., *"High Speed Pattern Matching For A Fast Huffman Decoder"*, IEEE Transactions On Consumer Electronics, US, IEEE Inc. New York, vol. 41, Feb. 1995, No. 1: pp. 97–103.
Patent Office: Invitation to Pay Additional Fees (Form PCT/ISA/206) and, Annex to Form PCT/ISA/206 Communications Relating to the Results of the Partial International Search, PCT/US99/10659.

*Primary Examiner*—Young Lee
(74) *Attorney, Agent, or Firm*—Wood, Herron & Evans, LLP (57) ABSTRACT

A variable length decoder (VLD) for decoding MPEG-1 and -2 syntax compliant video bit streams. The VLD includes a micro-sequencer and VLD command decode/execution unit for controlling the MPEG decoding process using a novel instruction set. The instruction set includes a set of commands for decoding the video data and a set of flow control instructions. A rotator/barrel shifter is provided for making a predetermined number of encoded bits from the video bit stream available to the VLD and a variable length table decoder for variable length decoding using the MPEG standard variable length code (VLC) tables. The variable length table decoder shares a prefix pattern matching scheme across all of the VLC tables and organizes the variable length codes into a series of subtables. Each subtable corresponds to one of the unique prefix patterns. Variable length codes are decoded by identifying a leading pattern in the video data bit stream and, in parallel, accessing the subtable corresponding to that leading pattern. Run-length and amplitude level DCT coefficient symbols are stored in compressed form, and decoded as needed by an inverse transform unit. Motion vectors are also stored until needed by a motion compensation unit.

10 Claims, 7 Drawing Sheets

PATTERN MATCH
VLC TABLE FOR "MACROBLOCK_ADDRESS_INCREMENT"

| VARIABLE LENGTH CODE | INCREMENT VALUE | PATTERN MATCH | CODE LENGTH |
|---|---|---|---|
| 1 | 1 | $K_0$ | 1 |
| 0 1 1 | 2 | $K_1$ | 3 |
| 0 1 0 | 3 | $K_1$ | 3 |
| 0 0 1 1 | 4 | $K_2$ | 4 |
| 0 0 1 0 | 5 | $K_2$ | 4 |
| 0 0 0 1 1 | 6 | $K_3$ | 5 |
| 0 0 0 1 0 | 7 | $K_3$ | 5 |
| 0 0 0 0 1 1 1 | 8 | $K_{4\_1}$ | 7 |
| 0 0 0 0 1 1 0 | 9 | $K_{4\_1}$ | 7 |
| 0 0 0 0 1 0 1 1 | 10 | $K_{4\_0}$ | 8 |
| 0 0 0 0 1 0 1 0 | 11 | $K_{4\_0}$ | 8 |
| 0 0 0 0 1 0 0 1 | 12 | $K_{4\_0}$ | 8 |
| 0 0 0 0 1 0 0 0 | 13 | $K_{4\_0}$ | 8 |
| 0 0 0 0 0 1 1 1 | 14 | $K_{5\_1}$ | 8 |
| 0 0 0 0 0 1 1 0 | 15 | $K_{5\_1}$ | 8 |
| 0 0 0 0 0 1 0 1 1 1 | 16 | $K_{5\_01}$ | 10 |
| 0 0 0 0 0 1 0 1 1 0 | 17 | $K_{5\_01}$ | 10 |
| 0 0 0 0 0 1 0 1 0 1 | 18 | $K_{5\_01}$ | 10 |
| 0 0 0 0 0 1 0 1 0 0 | 19 | $K_{5\_01}$ | 10 |
| 0 0 0 0 0 1 0 0 1 1 | 20 | $K_{5\_001}$ | 10 |
| 0 0 0 0 0 1 0 0 1 0 | 21 | $K_{5\_001}$ | 10 |
| 0 0 0 0 0 1 0 0 0 1 1 | 22 | $K_{5\_000}$ | 11 |
| 0 0 0 0 0 1 0 0 0 1 0 | 23 | $K_{5\_000}$ | 11 |
| 0 0 0 0 0 1 0 0 0 0 1 | 24 | $K_{5\_000}$ | 11 |
| 0 0 0 0 0 1 0 0 0 0 0 | 25 | $K_{5\_000}$ | 11 |
| 0 0 0 0 0 0 1 1 1 1 1 | 26 | $K_6$ | 11 |
| 0 0 0 0 0 0 1 1 1 1 0 | 27 | $K_6$ | 11 |
| 0 0 0 0 0 0 1 1 1 0 1 | 28 | $K_6$ | 11 |
| 0 0 0 0 0 0 1 1 1 0 0 | 29 | $K_6$ | 11 |
| 0 0 0 0 0 0 1 1 0 1 1 | 30 | $K_6$ | 11 |
| 0 0 0 0 0 0 1 1 0 1 0 | 31 | $K_6$ | 11 |
| 0 0 0 0 0 0 1 1 0 0 1 | 32 | $K_6$ | 11 |
| 0 0 0 0 0 0 1 1 0 0 0 | 33 | $K_6$ | 11 |
| 0 0 0 0 0 0 0 1 0 0 0 | MACROBLOCK_ESCAPE | | |

VARIABLE LENGTH DECODER FOR DECODING DIGITALLY ENCODED VIDEO SIGNALS

CROSS-REFERENCE

The present application claims the filing benefit of copending provisional application Ser. No. 60/085,797, filed on May 18, 1998, the disclosure of which is expressly incorporated herein by reference in its entirety.

FIELD OF THE INVENTION

The present invention relates to decoding of digitally encoded video signals and, more particularly, to a decoder for decoding video data and control information which have been encoded using fixed length values and variable length codes.

BACKGROUND OF THE INVENTION

Digital transmission of video signals has become more widely used in recent years, particularly in the consumer electronics industry. This growth in the use of digital video signal transmission and reception in digital versatile disc (DVD) players and digital video broadcasting (DVB) set-top-box applications, for example, has led to improved picture quality in the transmitted sequence of images and the ability to more effectively control storage, manipulation and display of the video signal over existing NTSC and PAL analog transmission systems. In furtherance of these advances, the industry sponsored Moving Pictures Expert Group (MPEG), chartered by the International Organization for Standardization (ISO), has specified formats for digital video compression, i.e., the syntax for encoding video bit streams, which are defined in two standards, ISO-11172-2 (MPEG-1) and ISO-13818-2 (MPEG-2). During the discussion to follow, the reader is hereby referred to ISO-11172-2 (MPEG-1) and ISO-13818-2 (MPEG-2) for a more detailed description of the bit stream syntax used to digitally encode video signals according to these standards. Each of these standards is hereby expressly incorporated herein by reference in its entirety.

The bit stream syntax defined by the MPEG-1 and -2 standards relates to three general types of information or data in the bit stream, namely control information which is necessary to define the bit stream, control information which is necessary to properly decompress and reproduce the transmitted sequence of images, and the encoded video data. The bit stream control information may identify that the bit stream is packetized video or audio data, or that the bit stream is a video signal encoded using either the MPEG-1 or -2 standard, for example. Image control information may include, as an example, the frame horizontal and vertical size, i.e., the number of picture elements (pels) per line and number of lines per frame, the frame or field rate, and the aspect ratio. As will be described in more detail below, the encoded video data represents the DCT transformed and quantized chrominance and luminance pel values that are necessary for recreation of each frame or field.

The MPEG-1 and -2 standards each specify a bit stream syntax designed to improve information density and coding efficiency by methods that remove spatial and temporal redundancies. Each MPEG picture is divided into a series of macroblocks which are made up of 16×16 luminance pels (Y), or a 2×2 array of four 8×8 transformed blocks of pels. Each macroblock is further made up of 8×16 chrominance pels (U, V), or a 1×2 array of two 8×8 blocks of pels. During the encoding process, spatial redundancies are removed by using Discrete Cosine Transform (DCT) coding of the 8×8 pel blocks followed by quantization, zigzag scan, and variable length coding of runs of zero (run-length) and amplitude levels. Motion compensated prediction is used to remove temporal redundancies.

For video, MPEG contemplates Intra (I-) frames, Predictive (P-) frames and Bidirectionally Predictive (B-) frames. The I-frames are independently coded and are the least efficiently coded of the three frame types. P-frames are coded more efficiently than the I-frames and are coded relative to the previously coded I- or P-frame. B-frames are coded the most efficiently of the three frame types and are coded relative to both the previous and the next I- or P-frame. The coding order of the frames in an MPEG system is not necessarily the same as the presentation order of the frames. Headers in the bit stream provide information to be used by the decoder to properly decode the time and sequence of the frames for presentation of a moving picture.

Typical video decoders that are used for decoding digitally transmitted video bit streams have a micro-controller or sequencer for controlling a variable length decoder (VLD) that is designed to parse the bit stream for decoding of the quantized DCT coefficients and motion vectors using the MPEG variable length code tables (VLC's). An inverse transform processor is used to transform each block of quantized coefficient values into a stream of values representing the inverse zigzag of the block and to dequantize the values. The dequantized DCT coefficients are passed to an inverse discrete cosine transform (IDCT) processor that performs an inverse DCT transform operation to recover the chrominance an luminance pel values. These values are then applied, in combination with the decoded motion vectors, to a motion compensation (MC) processor which then performs the MPEG decompression to convert I-, P- and B-frames into full video frames.

In typical VLD architectures for performing MPEG syntax compliant bit stream parsing and decoding, a predetermined number of undecoded bits of the video bit stream are stored in one or more registers. The VLD extracts a smaller number of these bits from the register(s) with the leftmost bit always aligned as the first bit extracted by the VLD. The VLD then performs a table look-up in one of the MPEG VLC tables to decode the variable length encoded video data and obtain the code length. After the variable length code in the extracted bits has been decoded, the VLD performs a MASK/SHIFT/OR operation on the bits in the register(s) to realign the first unused bit in the leftmost position of the register(s). The VLC tables are typically contained in one or more PALS or ROMs which have approximately $2^n \times m$ memory locations, where "n" represents the maximum possible variable code length in each of the VLC tables and "m" represents the number of unique VLC tables.

It will be appreciated by those skilled in the art that the SHIFT/MASK/OR operation required for alignment of the unused bits after the decode process in certain VLD architectures will significantly affect the overall decode speed of the VLD. Since each of these operations may require one or more cycles, the decode efficiency of the VLD is significantly decreased as multiple cycles are required by the VLD to decode each DCT coefficient symbol (i.e., each run-length and amplitude level pair) and then realign the unused bits. Additionally, the VLC table structure in certain VLD architectures adds cost and complexity to the VLD as each variable length code of each unique VLC table is stored in a separate memory location.

Thus, there is a need for a VLD that efficiently decodes variable length DCT coefficients and motion vectors which have been encoded according to the MPEG-1 or -2 standard. There is also a need for a VLD that minimizes the amount of memory required to decode the various MPEG variable length codes. There is yet also a need for a VLD that is able to receive instructions from a micro-sequencer in accordance with a predefined set of instructions, and further to receive instructions from a master controller.

SUMMARY OF THE INVENTION

The present invention is embodied in a variable length video decoder that is particularly suited for decoding MPEG-1 and -2 syntax compliant video bit streams. The video decoder is designed as a single event per cycle slice parsing engine for decoding the macroblock and block layers of individual slices to generate DCT coefficient values and motion vectors.

The video decoder incorporates a micro-sequencer that interfaces with a VLD command decode/execution unit to control the variable length decoding process according to the MPEG standard. During the decoding process, the micro-sequencer either issues commands to the VLD command decode/execution unit for performing variable length decoding or controls the program flow as provided through its instruction set which is stored in instruction ROM. The video decoder is further able to receive decode instructions from a RISC CPU that is responsible for upper layer parsing and controlling the overall decoding process for reconstruction of the decoded sequence of images.

Encoded video data is stored in DRAM memory and made available to the video decoder through a channel buffer FIFO. In accordance with one aspect of the present invention, a predetermined number of these encoded video data bits are made visible to the video decoder and a variable length table decoder through the use of a rotator/barrel shifter and pointer register. The barrel shifter and pointer register make the bits from pointer address to pointer address+31 visible as rotator/barrel shifter data to both the video decoder and a variable length table decoder. The video decoder is responsible for decoding the variable length code in the rotator/barrel shifter data to obtain the necessary DCT coefficients and motion vectors for each slice. After the variable length code is decoded, the pointer register of the rotator/barrel shifter is incremented to prepare for the next decode cycle.

In accordance with another aspect of the present invention, a novel scheme is provided to enable the video decoder to access each of the MPEG VLC tables to obtain the necessary decoded value. Each MPEG VLC table is divided into a series of subtables as defined by a unique prefix pattern identified in each of the tables. During the variable length decode process, the 32 bits of extracted rotator/barrel shifter data are applied to a pattern match logic and MUX control in the variable length table decoder to identify the unique prefix pattern in the rotator/barrel shifter data. In parallel, the bits after the prefix pattern are applied to all of the subtables in each of the MPEG VLC tables. After the variable length encoded data has been decoded, the variable length table decoder provides the decoded value and a valid code status bit. The variable length table decoder also provides a code length signal to the pointer register of the rotator/barrel shifter to increment the pointer register by the code length.

In accordance with yet another aspect of the present invention, the decoded DCT coefficients are stored as compressed run-length and amplitude level pairs in a run-level decoder/FIFO. The run-level decoder/FIFO decompresses the run-length and amplitude level pairs into DCT coefficients as needed by an inverse transform unit. This allows decoding of the Huffman encoded variable length pairs in parallel with the run-level decoding of previously decoded run-level pairs. Motion vectors are stored in a mv/dmv FIFO until needed by a motion compensation unit.

The above and other aspects, objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE PREFERRED EMBODIMENTS

Figure 1:
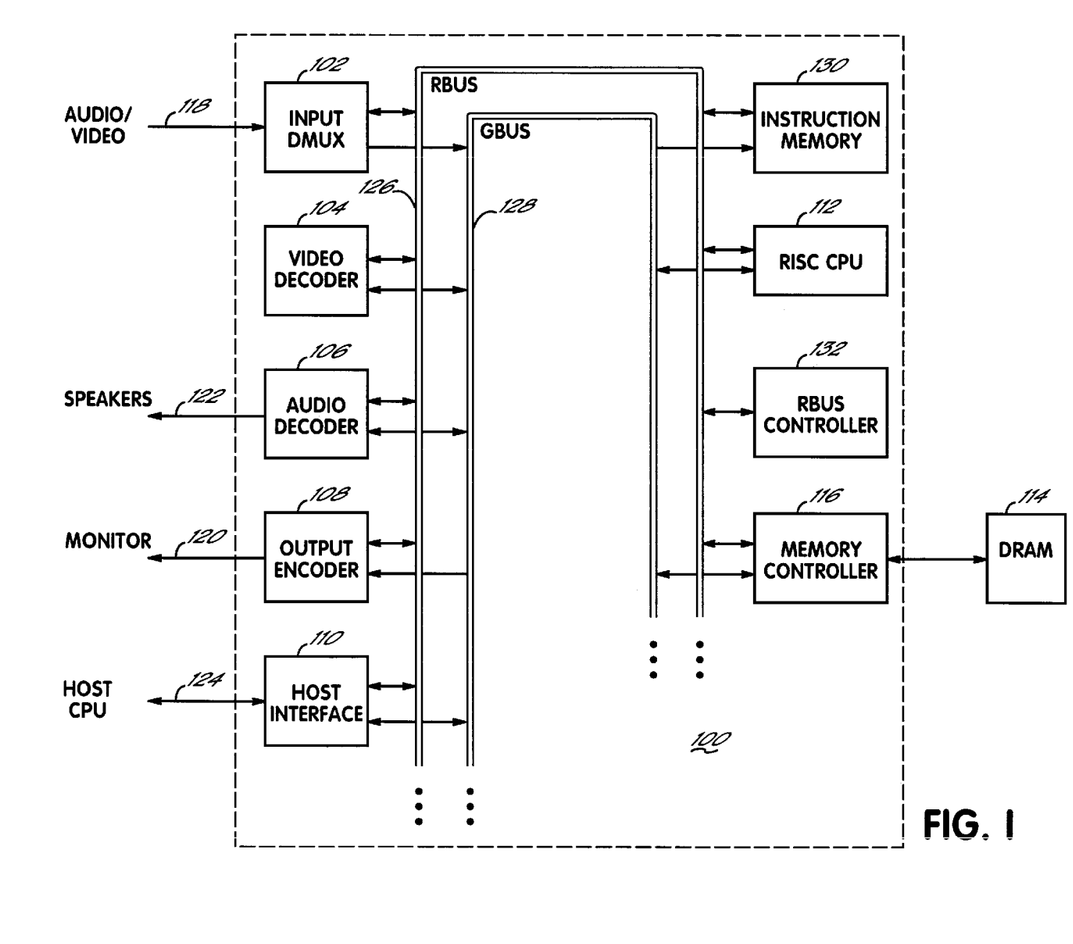
FIG. 1 is a block diagram of a video/audio decoder for performing digital audio/video signal data decompression and output in accordance with principles of the present invention.

With reference to the figures and to FIG. 1 in particular, a decoding system 100 is shown that incorporates various functional modules 102 through 112 for performing audio/video decoding of digitally encoded video signals and presentation of the decompressed video images. Preferably, decoding system 100 is configured as an application specific integrated circuit (ASIC) for the purposes of digital audio/video reception in digital versatile disk (DVD) and digital video broadcasting (DVB) set-top-box (STB) applications, for example. It will be understood that the functional units illustrated in FIG. 1 are exemplary, and in a practical implementation, additional functional units might be included. Each of the functional units 102 through 112 interacts in various ways with a large off-chip memory 114, which is a dynamic random access memory or DRAM. Access to DRAM 114 is controlled by a memory controller 116 on the ASIC 100.

For exemplary purposes, a few of the functional units of the ASIC 100 will be described. These functional units include a programmable input demultiplexor 102 which preferably receives the digitally encoded video/audio input signal on line 118 at a data rate of up to 72 Mbps. The digitally encoded video/audio signal is a serial bit stream of packetized data which is commonly referred to as a "Packetized Elementary Stream" or PES stream having a predefined bit stream syntax to identify the configuration of the packet data. The demultiplexor 102 is responsible for parsing the incoming digitally encoded signal into separate packets of video, audio or other data, and storing the input signal into buffers in DRAM 114 using memory controller 116. As will be described in more detail below, a video decoder 104 in accordance with the principles of the present invention functions to retrieve video data and image control information stored in a buffer in DRAM 114, decode the video data and control information (using frequent and repetitive accesses to DRAM memory 114), and thereafter deliver the decoded video information to output encoder 108 for output on a monitor via bus 120. Output encoder 108 is preferably an NTSC/PAL encoder for providing an image size of 720×480 pixels at 30 fps for NTSC and 720×576 pixels at 25 fps for PAL. An audio decoder 106 retrieves audio information from DRAM 114, decodes the audio information for output, and delivers the audio information for output to speakers via bus 122. ASIC 100 also includes a host interface 110 for interacting with a host microcontroller via lines 124 to permit the host computer to monitor and control operations of the ASIC 100.

In addition to the illustrated functional units, there may be one or more additional video decoding units for decoding subpicture video information which may incorporate subtitles or other information that accompanies the main video being decoded by video decoder 104. Furthermore, on-screen displays may be generated within ASIC 100 by an OSD section connected to RBUS 126 and GBUS 128. On-screen displays can be generated in response to commands received from the host CPU to provide feedback on the operation of the host CPU and/or the playback or reception status of the device in which ASIC 100 is being used.

Control of the application specific integrated circuit 100 is provided by a reduced instruction set central processing unit (RISC CPU) 112 which controls and monitors the operation of each of the other functional units on the ASIC 100. RISC CPU 112 responds to 16-bit instructions, which are stored in an instruction memory 130. Instruction memory 130 holds 4096 16-bit instructions, adequate for relatively straightforward programs of the ASIC 100. For more complex programs that might be performed by the ASIC 100, "pages" of 4096 instructions can be swapped in and out of program memory 130 from a much larger instruction buffer in DRAM 114.

As illustrated in FIG. 1, RISC CPU 112 interacts with each of the functional units in ASIC 100 via two main busses, known as the RBUS 126 and the GBUS 128. Specifically, each functional unit is connected to the 64 bit GBUS 128 through which data may be retrieved and delivered to the memory controller 116, and thus to or from DRAM 116. Furthermore, blocks of data may be transferred from one functional unit to another functional unit via the GBUS 128.

Requests for memory access or transfer, as well as various other commands, are passed from one functional unit to others via RBUS 126. RBUS 126 may comprise one or more 32-bit busses, used by functional units making frequent memory accesses, or a single 8-bit, time multiplexed bus shared by several functional units. An RBUS controller 132 receives requests for use of RBUS 126, arbitrates between these requests as necessary, and delivers access to the RBUS to the highest priority requesting functional unit.

When a memory access is requested, the requesting functional unit 102 through 112 delivers a virtual address over RBUS 126 to memory controller 116. The memory access request may request delivery of a single memory location, or may include an identification of a number of memory locations to be accessed in response to the request. Memory controller 116 responds to the request by managing access to the identified locations in DRAM 114 in response to the request. If multiple requests for memory access are pending at any time, memory controller 116 arbitrates between the pending requests to permit access to the highest priority requesting functional unit. Further details on the operation of the memory controller 116 in response to requests can be found in copending U.S. patent application Ser. No. 08/846,590, entitled "MEMORY ADDRESS GENERATION FOR DIGITAL VIDEO", filed on Apr. 30, 1997, which is hereby incorporated in its entirety herein by reference. Additionally, details on the operation of RISC CPU 112 and its reduced instruction set can be found in copending U.S. patent application Ser. No. 08/865,749, entitled SPECIAL PURPOSE PROCESSOR FOR DIGITAL AUDIO VIDEO DECODING, filed on May 30, 1997, which is hereby incorporated in its entirety herein by reference.

Additional data on the status of various functional units is available via RBUS 126. Functional units provide status information which can be accessed at a particular address identified via the RBUS 126. Thus, for example, to access a status word from the video decoder 104, an access request identifying the DEC_VALUE address is delivered to the RBUS controller 132. In response, the RBUS controller 132 causes the status word of video decoder 104 to be delivered to the requesting functional unit.

Commands are also sent to functional units via RBUS 126. To deliver commands to a functional unit, the commands are forwarded to a particular address for the functional unit via the RBUS. Thus, for example, to deliver a command to the video decoder 104, an access request identifying the VLD CMD address is delivered to the RBUS controller 132. In response, the RBUS controller 132 enables the requesting functional unit to deliver the command to the RBUS 126, and causes video decoder 104 to receive the command into its command buffer.

Video decoder 104 is the focus of the present invention and its operation and features are shown most clearly in FIGS. 2–6G. In accordance with the principles of the present invention, video decoder 104 is particularly adapted to perform video decoding of MPEG-1 and Main Profile@Main Level MPEG-2 syntax compliant digitally encoded video signals. As set forth in ISO/IEC 13182-2:1995 (E), which is incorporated herein by reference in its entirety, the MPEG-2 syntax defines a compressed bit stream of video data and control information representing a sequence of images in six layers, in particular: the sequence layer, the group of pictures layer, the picture layer, the slice layer, the macroblock layer and the block layer. Each of these layers in the encoded bit stream includes a unique start code which identifies the layer and provides either fixed length data values or variable length Huffman encoded data, or both which must be a parsed and decoded by video decoder 104. Upper layer parsing of image control information above the slice layer is handled by RISC CPU 112. In this way, RISC CPU 112 obtains sufficient information from the compressed video bit stream to control decompression, reconstruction and presentation of the transmitted sequence of images in the video bit stream.

Figure 2:
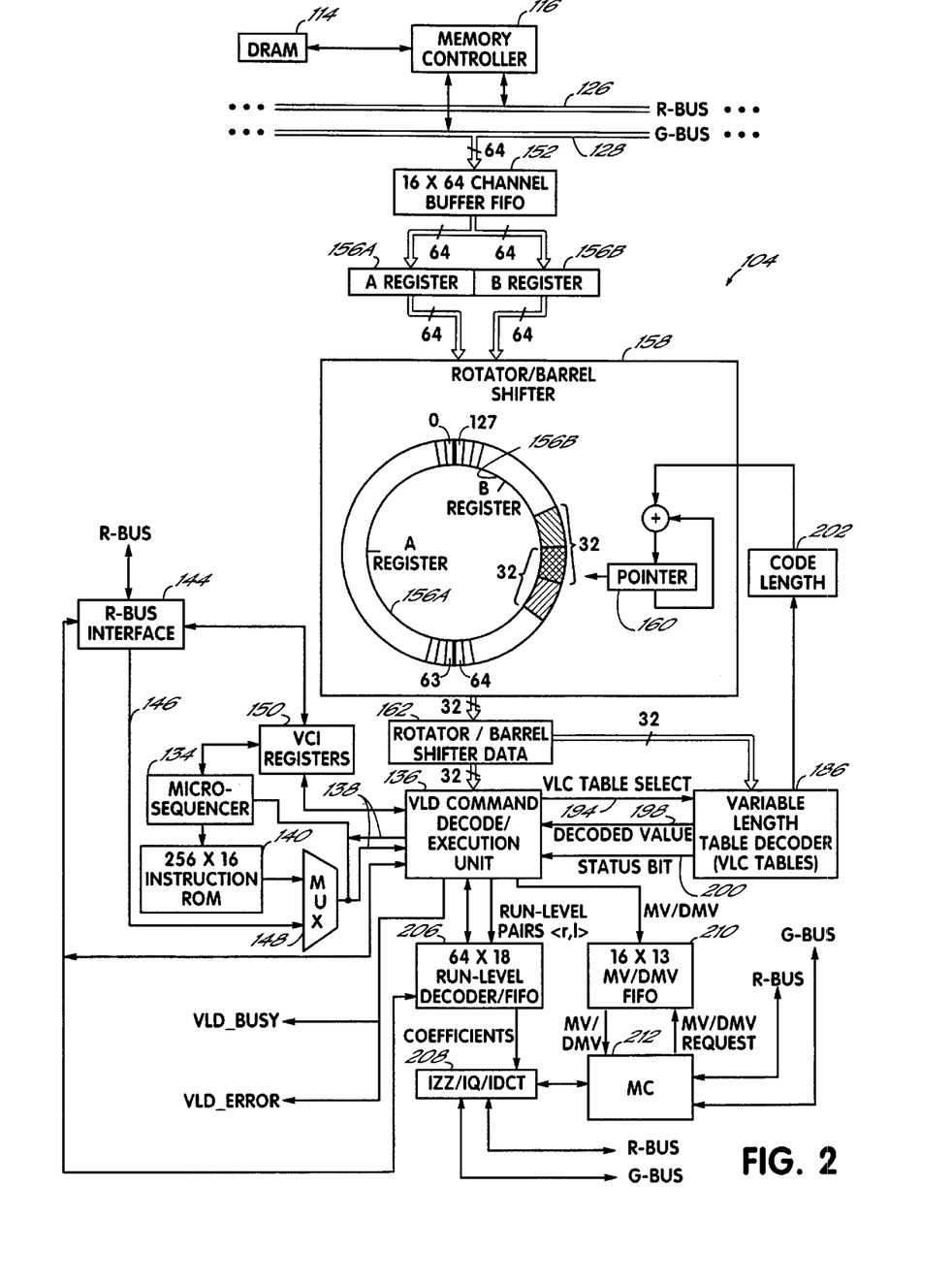
FIG. 2 is a block diagram of the video decoder in the decoding system shown in FIG. 1, including a variable length decoder or VLD for decoding digitally encoded video data and control information.
Figure 2A:
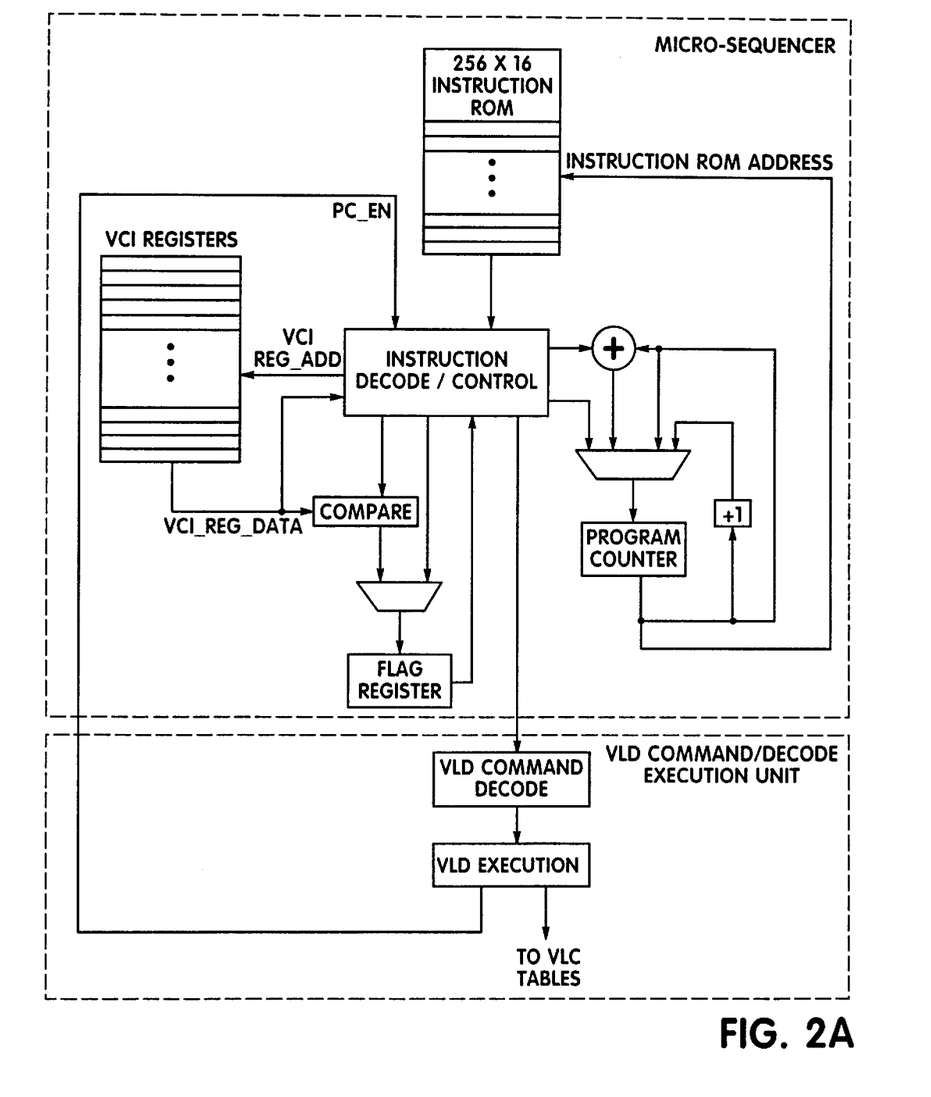
FIG. 2A is a block diagram of a micro-sequencer and VLD command/decode execution unit of the video decoder shown in FIG. 2.

Referring now to FIGS. 2 and 2A, a block diagram of the video decoder 104 is shown in detail. As will be described in more detail below, the primary function of video decoder 104 is a single ordered symbol per cycle slice parsing engine for decoding the macroblock and block layers of individual slices. When a slice end is reached, an interrupt is sent to RISC CPU 112 which performs various memory checks and then instructs processing of the next slice. Operation of video decoder 104 is primarily controlled through a micro-sequencer 134 that interfaces with a VLD command/decode execution unit 136 through lines 138. The micro-sequencer 134 includes a 256×16 instruction ROM 140 and an instruction decode/control unit 142 (see FIG. 2A). During the decoding process of the macroblock and block layers for each slice, the micro-sequencer 134 is programmed to either issue commands to the VLD command/decode execution unit 136 for performing variable length decoding or to control the program flow as provided through its instruction set. Additionally, the VLD command/decode execution unit 136 may receive instructions directly from RISC CPU 112 through RBUS interface 144, line 146 and multiplexor 148. As will be described in more detail below, the RISC CPU 112, micro-sequencer 134 and VLD command decode/execution unit 136 are able to read and write the content of a series of VLD command instruction registers (VCI registers) 150 which form part of the VLD architecture datapath.

As noted above, encoded video data is initially stored in DRAM 114. The encoded video data is available to video decoder 104 through memory controller 116 via the GBUS 128. Video decoder 104 includes a GBUS interface in the form of 16×64 channel buffer FIFO 152 that stores a sufficient amount of the coded video bit stream to insure that the buffer FIFO 152 does not empty or overfill during the decoding process.

One of the primary functions of the video decoder 104 is to decode variable length encoded data in the video bit stream. The variable length data is Huffman encoded in accordance with VLC tables defined in the MPEG-1 and -2 standards. The VLD of the present invention supports at least eleven of the MPEG VLC tables, including: macroblock_type_I; macroblock_type_P; macroblock_type_B; macroblock_type_D; macroblock_address_increment; dct_dc_size_luma; dct_dc_size_chrominance; ac_table (table 0 and table 1); coded_block_pattern; motion_code; and dmvector.

As shown most clearly in FIG. 2, the channel buffer FIFO 152 provides 64 bits of video data to each of a pair of A and B registers 156A and 156B through respective 64-bit busses from the channel buffer FIFO 152. In accordance with one aspect of the present invention, a rotator/barrel shifter 158 and pointer register 160 are provided to make the bits from the pointer address to pointer address+31 inclusive visible to the VLD command decode/execution unit 136. These 32 bits are provided to the VLD command decode/execution unit 136 as rotator/barrel shifter data 162.

Figure 3:
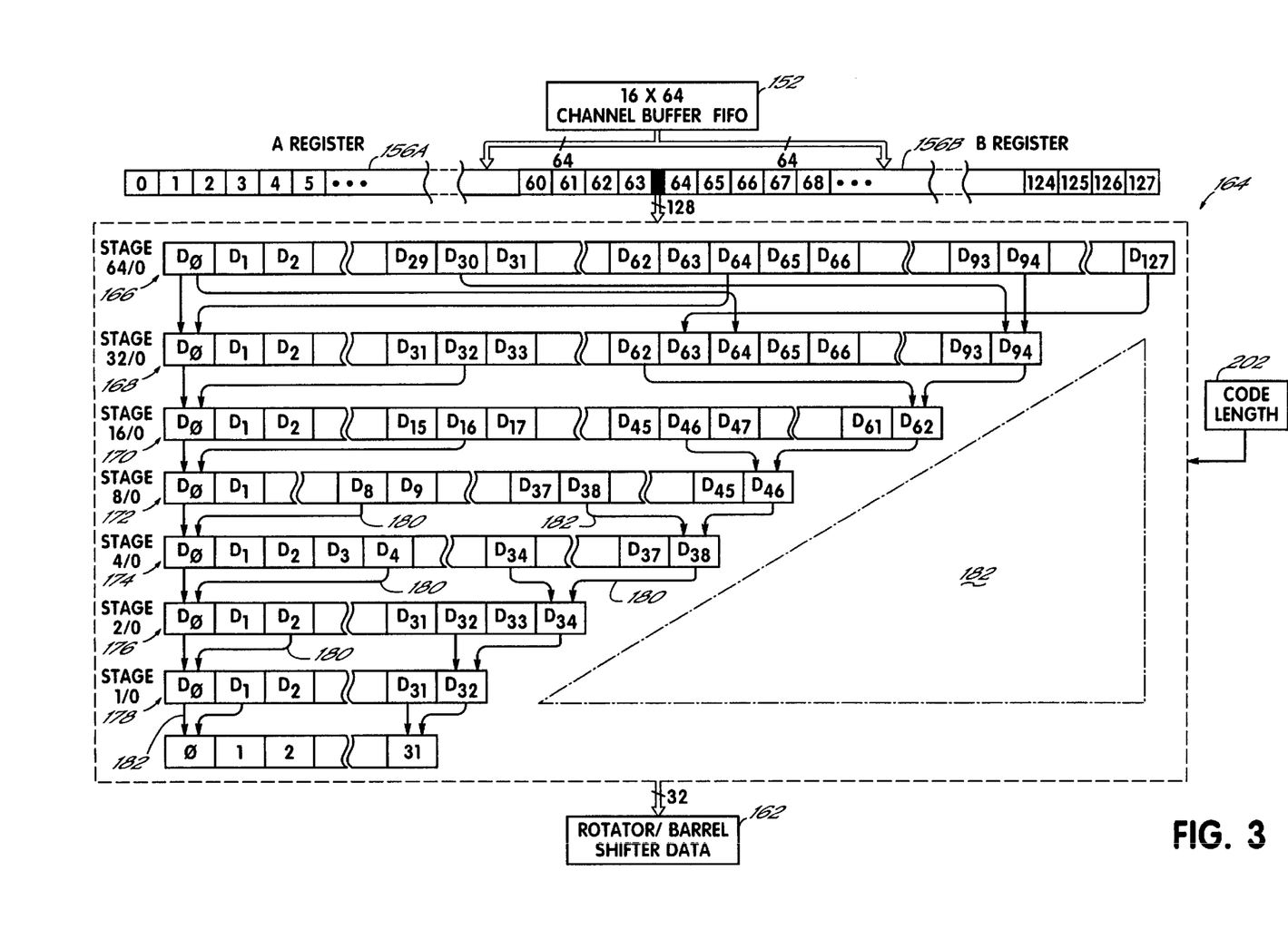
FIG. 3 is a schematic diagram of a rotator/barrel shifter circuit for providing 32-bit increments of encoded video data to the variable length decoder (VLD) command decode/execution unit and the variable length table decoder of FIG. 2.

With reference to FIGS. 2 and 3, the A and B registers 156A and 156B are connected in a 128-bit ring to permit boundary crossing of the pointer from bit 63 in A register to bit 64 in B register, and from bit 127 in B register to bit 0 in A register. When the pointer crosses from A register to B register, the contents of A register are refreshed with new data. Likewise, when the pointer crosses from B register to A register, the contents of B register are refreshed with new data. To permit movement of the pointer around the ring, and to make each of the 128 bits accessible to the pointer, the barrel shifter 164 shown in FIG. 3 has seven selector stages that provide various incremental shifts of data to the left by a power of 2 or no shift at all. The first stage 166, labeled "Stage 64/0", has 128 selectors ($D_0$–$D_{127}$) to allow each of the 128 bits to be shifted to the left 64 bits or not shifted at all. The second stage 168, labeled "Stage 32/0", has 95 selectors to provide shifting to the left of 32 bits or no shift at all. The third stage 170, labeled "Stage 16/0", has 63 selectors to provide shifting to the left of 16 bits or no shift at all. The fourth stage 172, labeled "Stage 8/0", has 47 selectors to provide shifting to the left of 8 bits or no shift at all. The fifth stage 174, labeled "Stage 4/0", has 39 selectors to provide shifting to the left of 4 bits or no shift at all. The sixth stage 176, labeled "Stage 2/0", has 35 selectors to provide shifting to the left of 2 bits or no shift at all, and the seventh and last stage 178, labeled "Stage 1/0", has 33 selectors to provide shifting to the left of 1 bits or no shift at all.

With the structure of barrel shifter 164, any 32 of the 128 bits in the A and B registers 156A and 156B may be made available to the VLD command decode/execution unit 136 as the rotator/barrel shifter data 162. In each of the stages 166–178, left shifts are indicated by arrows 180, while no shift is indicated by arrows 182. Those skilled in the art will appreciate that as used herein with respect to barrel shifter 164, the term "selector" means any circuit which provides the left-shift or no-shift operations described in detail above. With the operation of barrel shifter 164 in accordance with the present invention, various selectors can be eliminated from several of the stages 168–178, as indicated diagrammatically by the phantom triangle 182 in FIG. 3. By truncating the barrel shifter 164 to a trapezoidal shape rather than a symmetrical rectangular shape, it will be appreciated that unnecessary selectors may be eliminated to save cost and hardware real estate.

Figure 4:
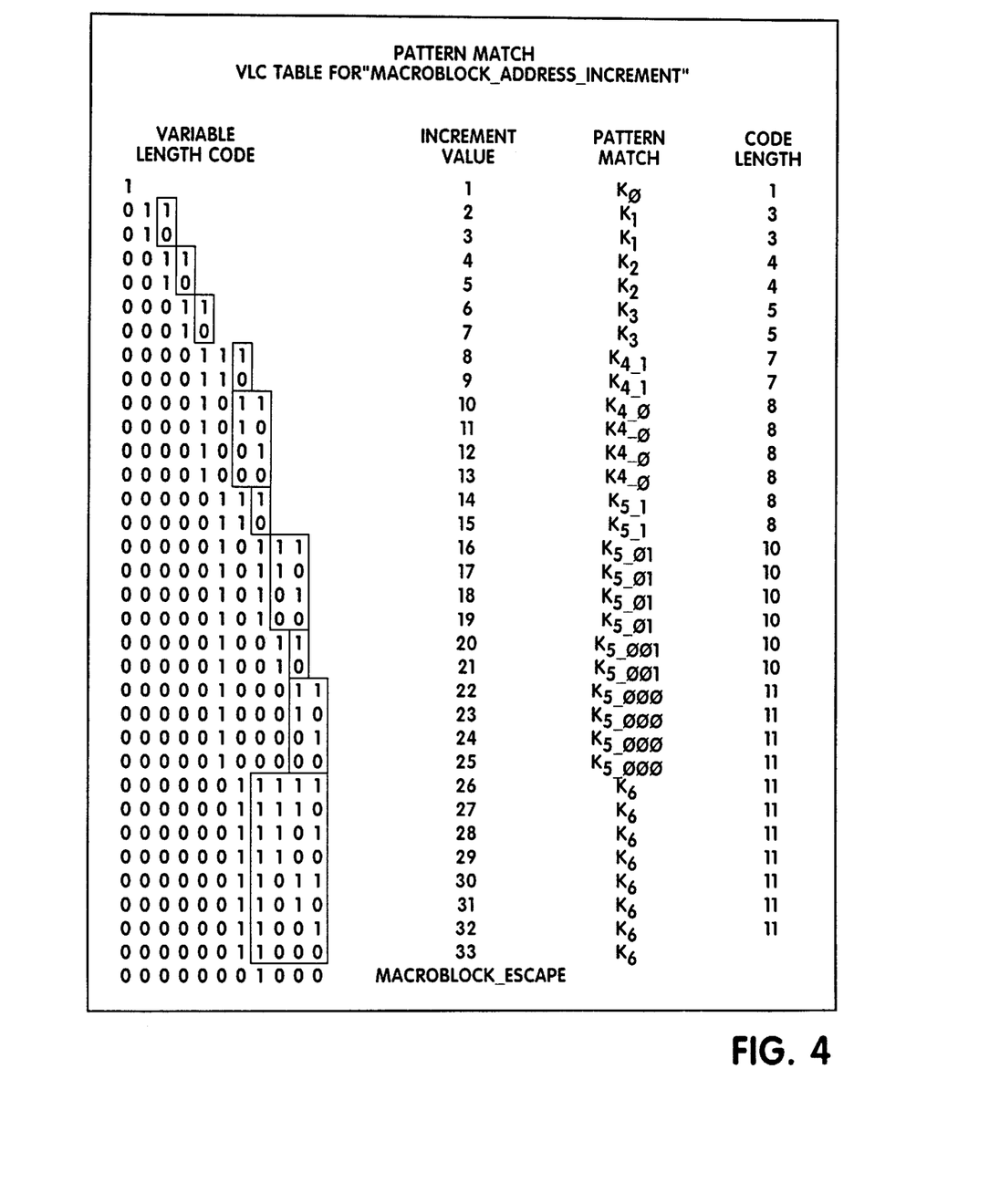
FIG. 4 is a representation of a pattern match structure in the "macroblock_address_increment" variable length code (VLC) table which is accessed by the variable length decoder (VLD) command decode/execution unit of FIG. 2.
Figure 5:
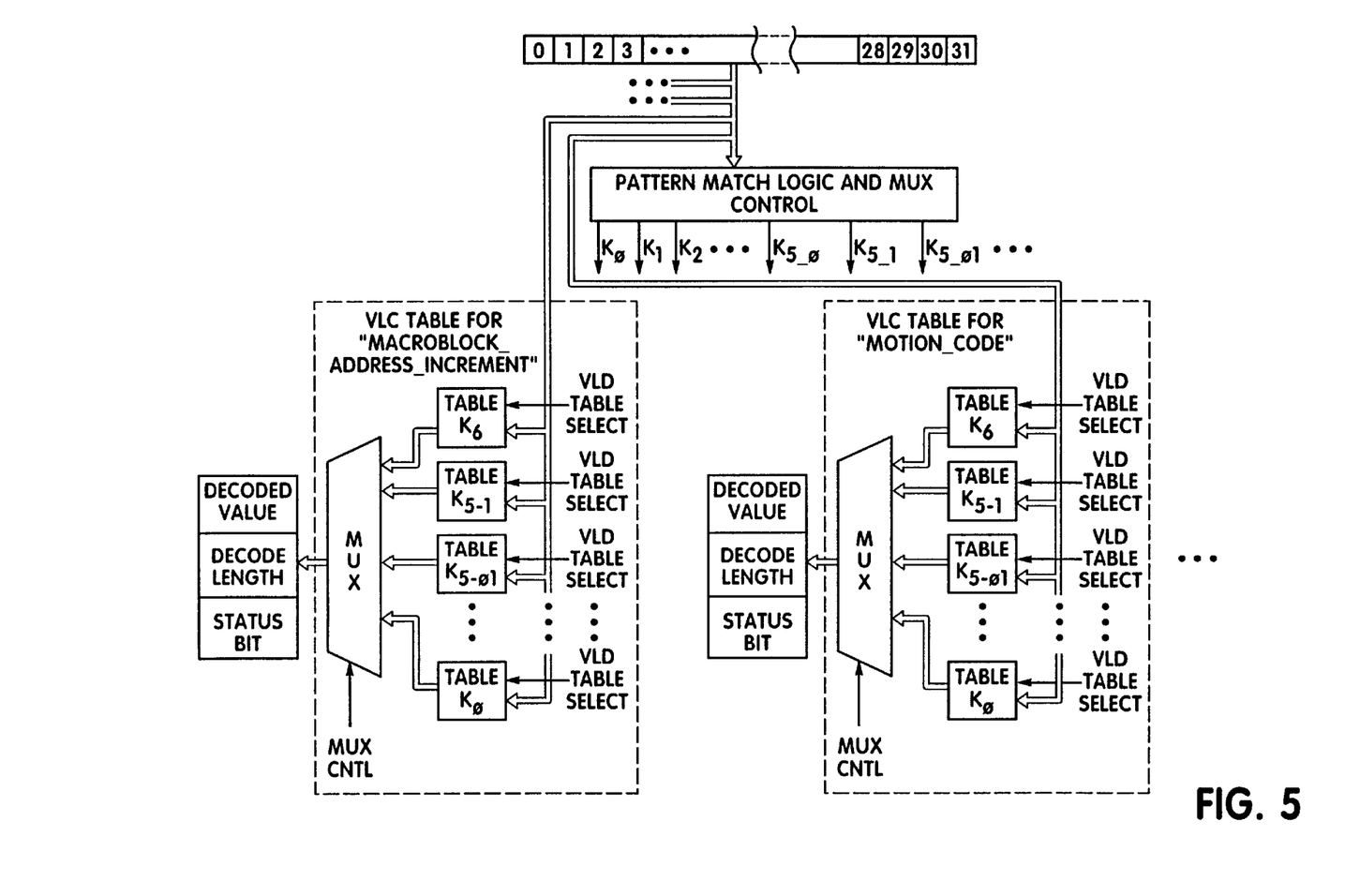
FIG. 5 is a functional block diagram of a decoding logic circuit used by the variable length decoder (VLD) of FIG. 2 in accessing variable length code (VLC) tables during the video data decompression process.

As shown most clearly in FIGS. 2 and 5, the 32 bits of rotator/barrel shifter data 162 are also made available to a variable length table decoder 184 which incorporates the MPEG standard variable length code (VLC) tables. In accordance with another aspect of the present invention, a novel scheme is provided to enable the VLD command decode/execution unit 136 to access each of the eleven MPEG VLC tables. As shown by way of example in the VLC table for "macroblock_address_increment" in FIG. 4, a prefix pattern is identified in each of the MPEG VLC tables that defines the number of "zeros" which lead the first occurrence of a "one" in the variable code, and any extra logic that is required to generate a set of all unique prefix patterns.

For example, in the "macroblock_address_increment" table of FIG. 4, each variable length code has a defined prefix pattern that is defined as $K_0$, $K_1$, $K_2$, $K_3$, $K_{4\_0}$, $K_{4\_1}$, $K_{5\_1}$, $K_{5\_01}$, $K_{5\_001}$, $K_{5\_000}$ and $K_6$. $K_0$ represents no "zeros" before the first occurrence of a "one", $K_1$ represents one "zero" before the first occurrence of a "one" and so on for $K_2$, $K_3$ and $K_6$. With several of the variable length codes, extra logic is required after the leading "zeros" before "one" pattern, such as $K_{4\_0}$, $K_{4\_1}$, $K_{5\_1}$, $K_{5\_01}$, $K_{5\_001}$, and $K_{5\_000}$, to generate a set of all unique prefix patterns. In this way, a set of subtables may be defined by the prefix pattern in each of the MPEG VLC tables, with each subtable corresponding to one of the unique prefix patterns. Moreover, each variable length code has a code length that defines the number of bits in the variable length code. An increment value is associated with each variable length code of "macroblock_address_increment" to define the horizontal position of the first macroblock in a slice with respect to the left edge of the picture, or the differential increment value from the most recently transmitted macroblock. Those skilled in the art will readily appreciate from this example how the prefix pattern and extra logic may be defined for the other MPEG VLC tables.

Referring now to the variable length table decoder 186 shown in FIG. 5, during the variable length decode process, the 32 bits of rotator/barrel shifter data 162 are applied to a pattern match logic and MUX control 188 to identify the unique prefix pattern in the rotator/barrel shifter data 162. The identified prefix pattern match, e.g., $K_0$, $K_1$, etc., is used as a signal "MUX CNTL" 190 to control the output of each MUX 192 in each of the eleven MPEG VLC tables. Thus, the prefix pattern match determined by pattern match logic and MUX control 188 is shared among all of the eleven MPEG VLC tables, including the "macroblock_address_increment" and "motion_code" VLC tables as shown in FIG. 5, to control the output of their respective MUX's 192.

The VLC table being decoded at any given time is determined by the "VLC TABLE SELECT" signal 194 provided by the VLD command decode/execution unit 136 as will be described in more detail below. At the same time that the prefix pattern match is being identified by pattern match logic and MUX control 188 to define the MUX CNTL signal 190 which is to be applied to each MUX 192, the bits after the leading pattern match in the 32 bits of rotator/barrel shifter data 162 are simultaneously applied to all of the subtables in each of the eleven MPEG VLC tables, as represented by busses 196. Thus, if VLC table "macroblock_address_increment" is selected by "VLC TABLE SELECT" signal 194, and the prefix pattern match is $K_{5\_1}$, and a "1" is applied via bus 196 to subtable $K_{5\_1}$, MUX 192 will output a decode value of 14 (representing the increment value), a code length of 8 (representing the number of bits in the variable length code) and a valid status bit (representing validity of the code) to the VLD command decode/execution unit 136. Thus, after the decode process is completed, the variable length table decoder 186 provides two signals to the VLD command decode/execution unit 136, including the decoded value 198 and the valid code status bit 200. The variable length table decoder 186 also provides a code length signal 202 on line 204 to the pointer register 160 to increment the pointer register by the code length. Preferably, the variable length table decoder 186 is hardwired optimized random logic, although it is also contemplated that it could be a RAM or ROM.

Referring now to FIGS. 2 and 3, the code length signal 202 from the variable length table decoder 186 is used to increment the pointer register 160. The code length signal 202 is also used by the barrel shifter 164 to control the necessary shifting pattern in the barrel shifter. For example, if the code length signal 202 has a value of 13, then stages 172 (8/0), 174 (4/0) and 178 (1/0) of the barrel shifter 164 would be enabled to cause a 13 bit shift to the left while all other stages would have no shift. After the shifting operation is performed by barrel shifter 164, a new set of rotator/barrel shifter data 162 is made visible to the VLD command decode/execution unit 136 and variable length table decoder 186. The variable length table decoder 186 and barrel shifter 164 of the present invention provide for efficient decoding of the MPEG variable length codes while at the same time reducing the memory requirements for the VLC tables.

In accordance with the MPEG standard, variable length coded DCT coefficients are decoded as run-length and amplitude level pairs, represented in FIG. 2 as symbol "<r, l>". The value "r" represents the number of zero value coefficients before the coefficient having the amplitude level represented by "l". For example, the symbol <5, 2> represents 5 zeros before the coefficient value of 2. In accordance with yet another aspect of the present invention, as the run-length and amplitude level pairs are decoded by the variable length table decoder 186, the run-length and amplitude level pair symbols are applied from the VLD command decode/execution unit 136 to a 64×18 run-level decoder/FIFO 206 that stores them as compressed pairs until needed by the inverse zigzag, inverse quantization and inverse DCT transform unit 208. It will be appreciated that as the number of compressed symbols is less than the number of DCT coefficients, the run-level decoder/FIFO 206 permits decoding of the Huffman encoded variable length pairs in parallel with the run-level decoding of previously decoded run-level pairs.

As also shown in FIG. 2, the decoded motion vectors "mv" and differential motion vectors "dmv" are applied from the VLD command decode/execution unit 136 to a 16×13 mv/dmv FIFO 210 that stores them until needed by the motion compensation unit 212. As described in detail in copending U.S. patent application Ser. No. 09/001,122, entitled "MOTION COMPENSATED DIGITAL VIDEO DECODING AND BUFFER MEMORY ADDRESSING THEREFOR", filed on Dec. 30, 1997, which is hereby incorporated herein by reference in its entirety, the decoded video data values and motion vectors are combined by the motion compensation unit 212 to form full I-, P- and B-frames for display. The VLD command decode/execution unit 136 preferably has state machines for motion vector, differential motion vector, macroblock increment address, dc coefficient and ac coefficient calculations.

FIGS. 6A–6G illustrate the instruction set supported by micro-sequencer 134 of the video decoder 104, while FIG. 2A illustrates the overall program flow control between micro-sequencer 134 and the VLD command decode/execution unit 136. In particular, the micro-sequencer instruction set includes eight instructions 214a–214g, each of which uses three bit opcodes 216, where instruction 214b represents two different instructions. Of the instructions shown in FIGS. 6A–6G, only the two instructions ICMD and CMDI of instruction 214b are execute commands. All other six instructions 214a and 214c–214g are flow control instructions as will be described in greater detail below. Most of the instructions 214a–214g operate off of data found in the VCI registers 150.

The following tables provide a description of the various VCI registers 150. Table 1 defines VCI control register descriptions. Table 2 defines macroblock and block layer register descriptions. Table 3 defines picture layer register descriptions for upper layer decoding. Table 3 registers are written by RISC CPU 112. Table 4 defines control and status register descriptions, and Table 5 defines predictor and state machine register descriptions.

TABLE 1

VCI Control Register Definition

| Name | Field | Type | Description |
|---|---|---|---|
| vci_addr | [5:0] | r/w | VCI indirect register address |
| vci_data | [15:0] | r/w | VCI indirect data |

The VCI control registers are used to access the VCI indirect registers defined in Tables 2–5 below. The RISC CPU 112 sets up the VCI_addr register to read or write the content of the VCI indirect registers of the specific address. This read and write operation is done by the VCI_data register.

TABLE 2

VCI Indirect Register Definition of macroblock level

| Name | Address | Width | Dir | Description |
|---|---|---|---|---|
| vci_mba_x | 0x00 | 7 | r/w | macroblock address x dimension |
| vci_mba_y | 0x01 | 7 | r/w | macroblock address y dimension |
| vci_vld_out | 0x02 | 16 | r/w | temporary output of VLD |
| vci_q_scale | 0x03 | 5 | r/w | quantizer scale information |
| vci_cbp | 0x04 | 8 | r/w | coded block pattern |
| vci_mtype | 0x05 | 5 | r/w | macroblock type |
| vci_motype | 0x06 | 3 | r/w | decoded motion type<br>[0] mv_count 0:1vector,1:2vector<br>[1] mv_format 0:field, 1:frame<br>[2] dmv |
| vci_dct_type | 0x07 | 1 | r/w | dct type 0:frame, 1:field |
| vci_mvfsl | 0x08 | 1 | r/w | motion vertical field select one |
| reserved | 0x09 | 1 |  | reserved |
| vci_temp_0 | 0x0a to 0x0f |  | r/w | reserved |

TABLE 3

VCI Indirect Register Definition of picture level layer

| Name | Address | Width | Dir | Description |
|---|---|---|---|---|
| vci_pic_init | 0x10 | 26 | r/w | [25:24]:DC precision<br>-->00:8-bit, 01:9-bit, 10:10-bit<br>-->11:11-bit<br>[23:20]: backward vertical fcode<br>[19:16]: backward horizontal fcode<br>[15:12]: forward vertical fcode<br>[11:8]: forward horizontal fcode<br>[7]: concealment motion vector<br>[6]: intra vlc format<br>[5]: frame_pred_frame_dct<br>[4:2]: picture coding type (I, P, B, D)<br>[1:0]: picture structure (field, frame)<br>-->[00]: reserved<br>-->[01]: top field<br>-->[10]: bottom field<br>-->[11]: frame |
| vci_seq_init | 0x11 | 10 | r/w | [10:4]: mb number x dimension<br>[3]: 0: regular, 1:special--blk type<br>[2]: 0: mpeg2, 1:mpeg1<br>[1:0]: chroma format<br>-->00: reserved, 01: 420, 10:422,<br>-->11: 444 |
| vci_conceal | 0x12 | 3 | r/w | concealment count register |
| vci_temp_1 | 0x13 to 0x1f |  | r/w | reserved |

TABLE 4

VCI Indirect Register Definition of Control and Status

| Name | Address | Width | Dir | Description |
|---|---|---|---|---|
| vci_cntl | 0x20 | 2 | r/w | vci state control register<br>[31:30]=00 : run<br>[31:30]=10: halt<br>[31:30]=11: reset |
| vci_pc | 0x21 | 8 | r/w | vci program counter |
| vci_rom | 0x22 | 16 | r/w | vci_rom output port |
| vci_dmvfifo_adr | 0x23 | 3 | r/w | dmb_fifo read/write address |
| vci_dmvfifo | 0x24 | 2 | r/w | dmv_fifo data port |
| vci_pointer | 0x25 | 7 | r/w | rotator pointer |
| vci_dec_lpred | 0x26 | 12 | r/w | Luma DC predicted value. A write to DC_lpred resets to a constant value as indicated by the DC precision bit in DEC_mode register. |
| vci_dec_cpred | 0x27 |  | r/w | Chroma DC predicted value. A write to DEC_cpred resets to a constant value as indicated by the DC precision bits in DEC_mode register. |
|  |  | [23:12] | V |  |
|  |  | [11:10] | U |  |
| vci_temp_2 | 0x28 to 0x2f |  |  | reserved |

TABLE 5

VCI Indirect Register Definition of predictors & state machine

| Name | Address | Width | Dir | Description |
|---|---|---|---|---|
| vci_mv_predfh0 | 0x30 | 13 | r/w | mvfs, motion vector predictor forward horizontal -first |
| vci_mv_predfv0 | 0x31 | 13 | r/w | mvfs, motion vector predictor forward vertical -first |
| vci_mv_predbh0 | 0x32 | 13 | r/w | mvfs, motion vector predictor backward vertical -first |
| vci_mv_predfh1 | 0x34 | 13 | r/w | mvfs, motion vector predictor forward horizontal -second |
| vci_mv_predfv1 | 0x35 | 13 | r/w | mvfs, motion vector predictor forward vertical -second |
| vci_mv_predbh1 | 0x36 | 13 | r/w | mvfs, motion vector predictor backward horizontal -second |
| vci_mv_predbv1 | 0x37 | 13 | r/w | mvfs, motion vector predictor backward vertical -second |
| vci_err_bits | 0x38 | 10 | r | error conditions<br>[9] motype_err<br>[8] coef_err<br>[7] rl_error<br>[6] cbp_err<br>[5] mv_err<br>[4] mbi_err<br>[3] mtype_err<br>[2] get_ac_err<br>[1] dctdcsz_chroma_err<br>[0] dctdcsz_luma_err |

TABLE 5-continued

VCI Indirect Register Definition of predictors & state machine

| Name | Address | Width | Dir | Description |
|---|---|---|---|---|
| vci_stm | 0x39 | 4 | r | state machines:<br>[14:12] vstate : motion vec STM<br>[11:9] dc_cstate : dc STM<br>[8:7] sc_state : start-code STM<br>[6:3] ms_cstate : MB STM<br>[2:0] lc_cstate : block STM |
| vci_tmp_3 | 0x3a to 0x3f | | | |

Table 6 defines VLD control registers with RBUS interface 144:

TABLE 6

VLD Registers with r bus interface

| Name | Dir | Bit Field | Description |
|---|---|---|---|
| dec_value1 | r/w | [15:0] | hold the decoded value for all commands except the DECODE BLOCK commands. DECODE BLOCK commands return the decoded DC coefficient in this field. |
| dec_value2 | r/w | | This value hold the current run and level. |
| | | [17:12] | Decoded run length |
| | | [11:0] | Decoded level |
| mvfifo_adr | r/w | [4:0] | mv_fifo read/write address<br>bit4 - 0: read, 1: write |
| mvfifo_data | r/w | [12:0] | mv_fifo data port |
| vld_cntl | r/w | [31:30] | 00: run, 10: halt, 11:reset |
| vld_pic_hdr | r/w | [31:0]] | picture level params:<br>[31:28] f_code[0][0] (F,H)<br>[27:24] f_code[0][1] (F,V)<br>[23:20] f_code[1][0] (B,H)<br>[19:16] f_code[1][1] (B,V)<br>[15:14] intra_dc_prec<br>[13:12] pic_structure<br>[11] topfld_first<br>[10] frame_prediction_frame_dct<br>[9] concealment_motion_vectors<br>[8] q_scale_type<br>[7] intra_vlc_format<br>[6] alternate_scan<br>[5] repeat_first_field<br>[4] chroma_420<br>[3] progressive_frame<br>[2:0] pic_type |
| rlfifo_adr | r/w | [6:0] | rl_fifo read/write address<br>bit6 - 0: read, 1: write |
| rlfifo_data | r/w | [17:0] | rl_fifo data port |
| vld_status | r/w | [10:0] | status bits<br>[10] vld_busy<br>[9] vld_mv_fifo_empty<br>[8] vld_cfifo_empty<br>[7:4] chfifo_wr_addr<br>[3:0] chfifo_rd_addr |
| vld_cmd | w | [7:0] | vld command to be executed from cpu. |
| dec_status | r/w | [15] | error. Set if bitstream error is detected. Sticky bit |
| | | [14] | chan_fifo_empty, Channel FIFO empty. |
| | | [13:10] | chan_fifo_wrprt. Channel FIFO write pointer. |
| | | [9:6] | chan_fifo_rdptr. Channel FIFO read pointer |
| | | [5:0] | bitcnt. Decoder bitstream read pointer. Contains number of bits to be read next by decoder. |

TABLE 6-continued

VLD Registers with r bus interface

| Name | Dir | Bit Field | Description |
|---|---|---|---|
| vld_cmd | r/w | [7:0] | vld command from cpu -- the vld command will be executed if this address is written from rbus interface. |

Table 7 defines VLD control registers with GBUS interface 152:

TABLE 7

VLD Registers with g bus interface

| Name | Dir | Bit Field | Description |
|---|---|---|---|
| word_fifo | r/w | [63:0] | Decoder FIFO data port |

Referring now to the micro-sequencer instructions 214a–214g of FIGS. 6A–6G, the TBIT (test bit) instruction 214a tests a bit (given by "bitnum" 218) in the VCI register 220 and branches if equal to the value of the 4-bit forward relative address 222. The COMP (compare) instruction 214c compares the 8 msb or 8 lsb data contents of the vci_vld_out register (determined by status of "msb" 224) with immediate data 226 and saves the result in flag register 228. If "st_code" 230=1, the contents of the vci_vld_out register are compared with the start code pattern, and the flag register 228 is set if they match to indicate that a start code has been found. The BRANCH instruction 214d performs an absolute branch to the 8-bit branch target address 232. The "err" bit 234 indicates vci error and the "halt" bit 236 indicates to change the vci control register to a halt state. The SETF (set flag) instruction 214e sets the 8 lsb of the flag register with the value according to immediate data 238. The INCM (increment macroblock) instruction 214f compares lower byte of VCI register 240 with immediate data 242 and stalls if not equal. In the last of the flow control instructions, the HALT instruction 214g halts the video decoder 104 and deasserts the vld_busy signal.

Figure 6A:
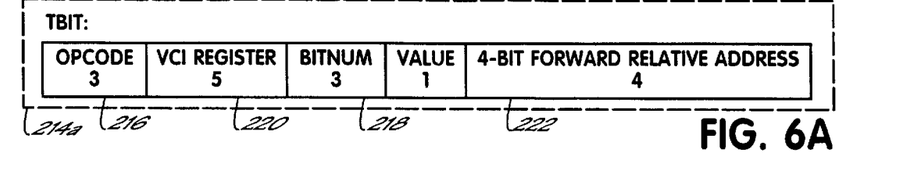
FIG. 6A is a micro-sequencer instruction format for the TBIT instruction.
Figure 6B:
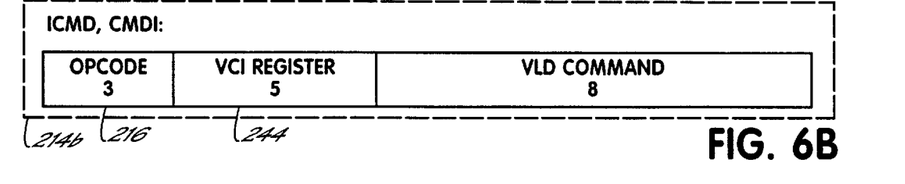
FIG. 6B is a micro-sequencer instruction format for the ICMD, CMDI instructions.
Figure 6C:
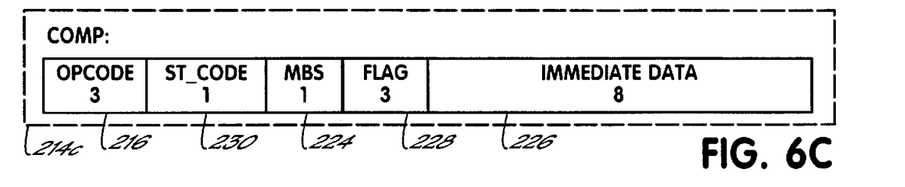
FIG. 6C is a micro-sequencer instruction format for the COMP instruction.
Figure 6D:
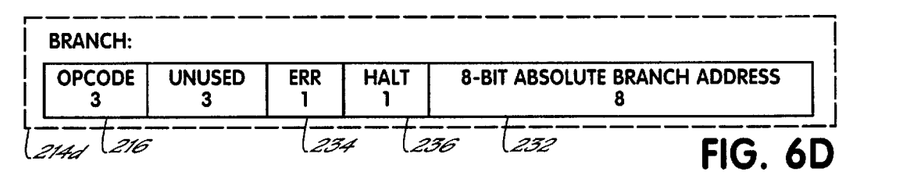
FIG. 6D is a micro-sequencer instruction format for the BRANCH instruction.
Figure 6E:
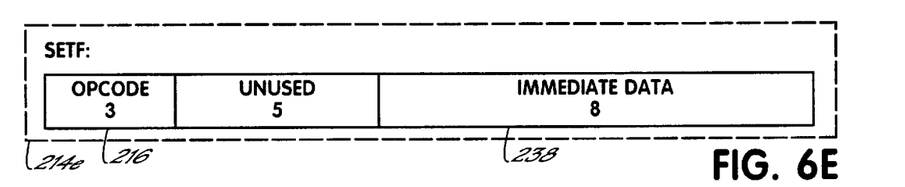
FIG. 6E is a micro-sequencer instruction format for the SETF instruction.
Figure 6F:
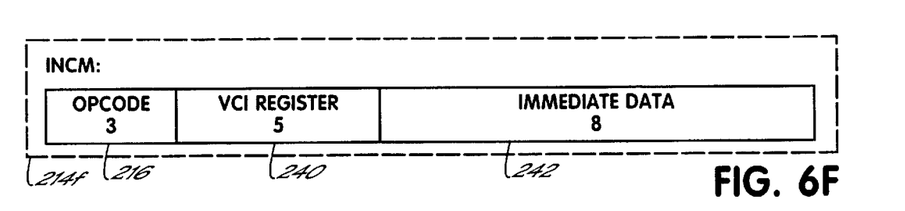
FIG. 6F is a micro-sequencer instruction format for the INCM instruction.
Figure 6G:
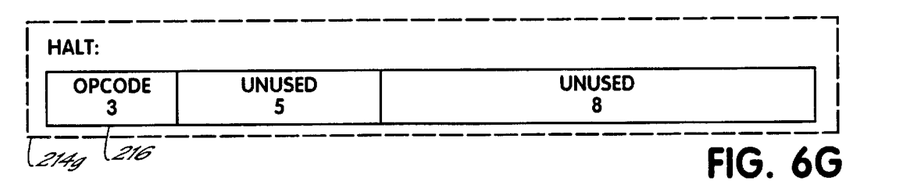
FIG. 6G is a micro-sequencer instruction format for the HALT instruction.

The ICMD and CMDI (issue command) instructions 214b issue one of twenty-two commands to video decoder 104 and store the output in VCI register 244. With the ICMD instruction, the micro-sequencer 134 issues a command to video decoder 104 and waits. The CMDI instruction causes the micro-sequencer 134 to issue a command to video decoder 104 and keeps running the microcode.

The various commands issued to the video decoder 104 are provided in Table 8:

TABLE 8

VLD Command

| OP code | Symbol | Description |
|---|---|---|
| 0000 0001 | <vld_escape> | macroblock escape |
| 0000 0010 | <vld_peek> | peek - don't execute just update CC |
| 0000 0011 | <vld_startcode> | find start code |
| 0000 0100 | <vld_mbi> | macroblock address increment |
| 0000 0101 | <vld_cbp> | coded block pattern |
| 0000 0110 | <vld_intra_luma> | run intra luma block |
| 0000 0111 | <vld_intra_chromau> | run intra chroma U block |
| 0000 1000 | <vld_intra>chromav> | run intra chroma V block |
| 0000 1001 | <vld_non_intra> | run non-intra block |

TABLE 8-continued

VLD Command

| OP code | Symbol | Description |
|---|---|---|
| 0000 1010* | <vld_mbs> | generate macroblock start signal |
| 0000 1100* | <vld_dpcm> | reset luma and chroma predictor |
| 0000 1101* | <vld_mv_pred> | reset motion vector predictor |
| 0001 0000 | <vld_dmv> | get dual prime motion vector |
| 0001 0100 | <vld_non_coded> | run non-coded block |
| 0001 0101 | <vld_field_motype> | decode field motion type |
| 0001 0110 | <vld_frame_motype> | decode frame motion type |
| 0001 1000 | <vld_mtypei> | get macroblock type for I picture |
| 0001 1001 | <vld_mtypep> | get macroblock type for P picture |
| 0001 1010 | <vld_mtypeb> | get macroblock type for B picture |
| 0001 1011 | <vld_mtyped> | get macroblock type for D picture |
| 0010 xxxx | <vld_get<bitxx> | get the next 1 to 16 bits (0= > 16) |
| 0011 0xyz | <vld_mvxyz> | get motion vector: x-forward, y-horizon, z-first |

*need to dispatch from cmdi instruction

The VLD commands of Table 8 are autonomous operations that are common to many various types of encoding. The VLD instructions may be generally categorized as variable length table decode commands for obtaining values from the MPEG VLC tables, instructions for receiving a parameterized number of bits from the encoded video data, or block operations.

The <vld_get_bitxx> command, for example, extracts a specified number of bits from the rotator/barrel shifter 158, and increments the pointer register 160 by the number of bits retrieved. The <vld_dmv> command retrieves a motion vector value from one of the MPEG VLC tables using three parameters from the video data bit stream. Specifically, each motion vector is stored as a combination of the previous motion vector and a prediction. The prediction is itself coded in the form of a quotient (variable length encoded) and a remainder (fixed length code). The <vld_dmv> command is used to decode the quotient through the MPEG VLC tables to determine the location of the remainder and the value of the quotient. The remainder is obtained using the <vld_get_bitxx> command. Finally, the quotient and remainder are combined to create the motion vector component. The <vld_peek> command permits visibility of a specified number of bits from the rotator/barrel shifter 158 without incrementing the pointer register 160 by the number of bits retrieved.

While the present invention has been illustrated by a description of various embodiments and while these embodiments have been described in considerable detail, additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicants' general inventive concept.

Having described the invention, what is claimed is:

1. A variable length decoder for decoding a stream of compressed video data, wherein the stream includes a plurality of variable length encoded data representing image areas of transmitted frames, comprising:

a memory for storing variable length encoded data;

a command decode and execution circuit coupled to the memory for receiving selected variable length encoded data from the memory;

a sequencer coupled to the command decode and execution circuit for providing commands to the command decode and execution circuit in accordance with a set of instructions stored within the sequencer to convert the variable length encoded data into corresponding decoded values;

a master controller coupled to the command decode and execution circuit for providing commands to the command decode and execution circuit independently of the sequencer to control decoding operation of the command decode and execution circuit; and a plurality of command instruction registers coupled to the sequencer and the master controller, wherein the sequencer and the master controller are operable to read and write contents of the command instruction registers which include data that form at least a part of the set of instructions stored within the sequencer.

2. The variable length decoder of claim 1 wherein the sequencer includes memory for storing a plurality of instructions and an instruction decode and control circuit coupled to the instruction memory for decoding instructions from the memory and providing commands to the command decode and execution circuit to convert the variable length encoded data into corresponding decoded values.

3. The variable length decoder of claim 1 further comprising a variable length table decoder coupled to the command decode and execution circuit for receiving variable length encoded data and provided a corresponding decoded value to the command decode and execution circuit.

4. The variable length decoder of claim 1 wherein the command decode and execution circuit is operable to decode variable length encoded data conforming to an MPEG syntax.

5. The variable length decoder of claim 4 wherein the command decode and execution circuit is operable to decode the variable length encoded data into DCT coefficient symbols each including a run-length value and an amplitude level value.

6. The variable length decoder of claim 5 further comprising a first-in first-out memory and decoder coupled to the command decode and execution circuit for storing the DCT coefficient symbols as compressed run-length and amplitude level pairs.

7. The variable length decoder of claim 6 further comprising an inverse DCT transform circuit coupled to the first-in first-out memory and decoder, wherein the first-in first-out memory and decoder is operable to decompress the run-length and amplitude level pairs into DCT coefficients for use by the inverse DCT transform circuit in reconstructing image data of the transmitted frames.

8. The variable length decoder of claim 4 wherein the command decode and execution circuit is operable to decode the variable length encoded data into motion vector values.

9. The variable length decoder of claim 8 further comprising a first-in-first-out memory coupled to the command decode and execution circuit for storing the motion vector values.

10. The variable length decoder of claim 8 further comprising a motion compensation circuit coupled to the first-on-first-out memory, wherein the first-in-first-out memory is operable to provide the motion vector values to the motion compensation circuit in reconstructing image data of the transmitted frames.

* * * * *

UNITED STATES PATENT AND TRADEMARK OFFICE
CERTIFICATE OF CORRECTION

PATENT NO.    : 6,704,361 B2
DATED         : March 9, 2004
INVENTOR(S)   : Moshe Bublil et al.

It is certified that error appears in the above-identified patent and that said Letters Patent is hereby corrected as shown below:

Title page,
Item [56], References Cited, OTHER PUBLICATIONS, change "No. 1: pp. 97-103." to -- No. 1; pp. 97-103. --.

Drawings,
Substitute FIG. 2A with the attached FIG. 2A
Substitute FIG. 5 with the attached FIG 5.

Column 2,
Line 31, change "an luminance pel values." to -- and luminance pel values. --.

Column 6,
Line 5, change "DRAM 116." to -- DRAM 114. --.
Line 55, change "the VLD CMD address" to -- the VLD_CMD address --.

Column 7,
Line 9, change "encoded data, or both which" to -- encoded data, or both, which --.
Line 9, change "which must be a parsed and decoded by" to -- which must be Parsed and decoded by --.

Column 8,
Line 31, change "to the left of 1 bits" to -- to the left of 1 bit --.

Column 11,
Line 58, Table 3, change "vci_seq_$_{init}$" to -- vci_seq_init --.

Column 13,
Line 37, Table 6, change "[31:0]]" to -- [31:0] --.

UNITED STATES PATENT AND TRADEMARK OFFICE
CERTIFICATE OF CORRECTION

PATENT NO. : 6,704,361 B2
DATED : March 9, 2004
INVENTOR(S) : Moshe Bublil et al.

It is certified that error appears in the above-identified patent and that said Letters Patent is hereby corrected as shown below:

Column 16,
Line 60, change "decoder of claim 8" to -- decoder of claim 9 --.

Signed and Sealed this

Fourteenth Day of September, 2004

JON W. DUDAS
*Director of the United States Patent and Trademark Office*

FIG. 2A

FIG. 5